United States Patent
Wang

(10) Patent No.: US 8,857,469 B2
(45) Date of Patent: Oct. 14, 2014

(54) WATER VALVE SUITABLE FOR USE WITH A BATHTUB

(71) Applicant: Geann Industrial Co., Ltd., Lu Kang Chen (TW)

(72) Inventor: Hsiang-Shih Wang, Changhua (TW)

(73) Assignee: Geann Industrial Co., Ltd., Chang Hua Hsien (TW)

( * ) Notice: Subject to any disclaimer, the term of this patent is extended or adjusted under 35 U.S.C. 154(b) by 239 days.

(21) Appl. No.: 13/649,111

(22) Filed: Oct. 11, 2012

(65) Prior Publication Data

US 2014/0102574 A1   Apr. 17, 2014

(51) Int. Cl.
*F16K 11/074* (2006.01)
*F16K 31/00* (2006.01)

(52) U.S. Cl.
CPC .................................... *F16K 11/074* (2013.01)
USPC .................. 137/625.15; 137/625.46; 251/297

(58) Field of Classification Search
CPC ........ F16K 11/076; F16K 11/074; E03C 1/04

USPC .......................... 137/625.15, 625.46; 251/297
See application file for complete search history.

(56) References Cited

U.S. PATENT DOCUMENTS

| | | | | |
|---|---|---|---|---|
| 3,385,321 A | * | 5/1968 | Ehrens et al. | 137/625.46 |
| 3,986,701 A | * | 10/1976 | Hopkins | 251/297 |
| 5,193,582 A | * | 3/1993 | Antoniello et al. | 137/625.14 |
| 6,789,573 B2 | * | 9/2004 | Knapp | 137/625.15 |
| 7,059,349 B2 | * | 6/2006 | Breda | 137/625.11 |
| 7,066,204 B2 | * | 6/2006 | Marty | 137/625.11 |
| 7,261,126 B2 | * | 8/2007 | Jeromson et al. | 137/625.41 |
| 7,644,728 B2 | * | 1/2010 | Yang | 137/625.15 |
| 8,176,937 B2 | * | 5/2012 | Zhang et al. | 137/597 |
| 8,646,750 B1 | * | 2/2014 | Chen | 251/160 |

* cited by examiner

*Primary Examiner* — Eric Keasel
*Assistant Examiner* — Josephine Trinidad-Borges

(57) ABSTRACT

A water valve suitable for use with a bathtub has a housing, a control bolt, an angular positioning device, an upper ceramic plate, a lower ceramic plate and a valve base. The water valve is mounted onto a water supply unit of the bathtub and used for switching between different water outlet options.

8 Claims, 6 Drawing Sheets

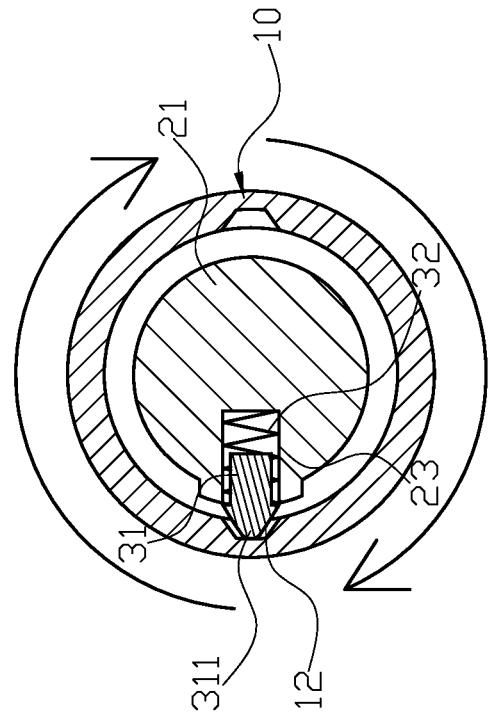
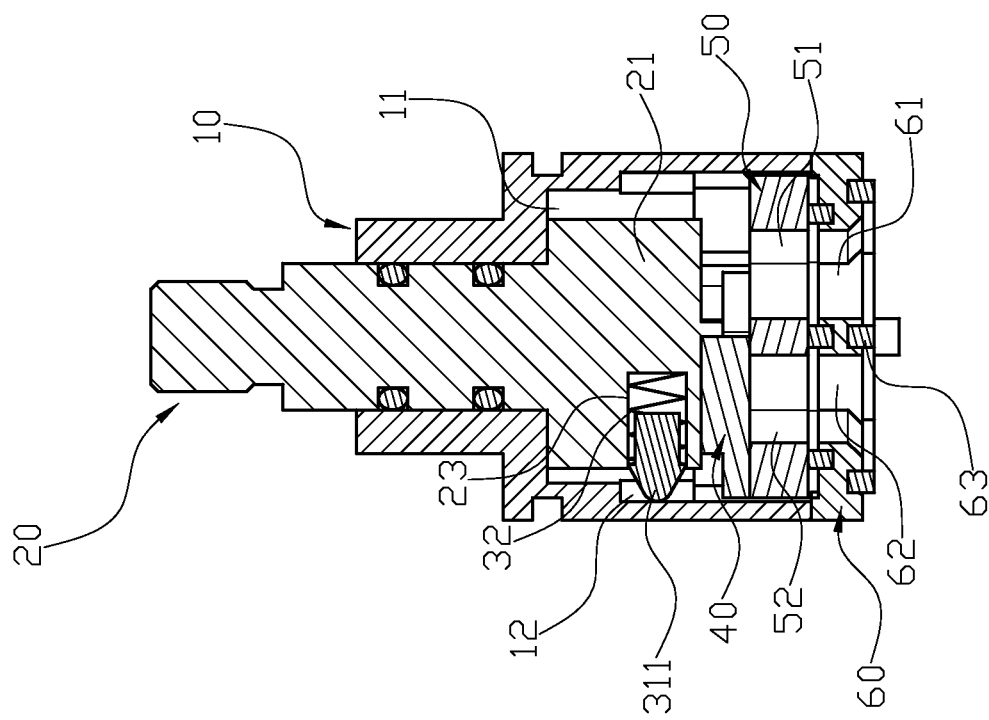
FIG. 5
FIG. 4

WATER VALVE SUITABLE FOR USE WITH A BATHTUB

BACKGROUND OF THE INVENTION

1. Field of the Invention

The present invention relates to a water valve, and more particularly to a water valve for use with a bathtub.

2. Description of the Related Art

Currently, there are two most common water outlet designs for bathtub, one is providing a water outlet closely above the bathtub to fill up the bathtub; another one is provide a water outlet as a showerhead. These two different options are both controlled by one faucet, and a switch is provided to switch between two outlets by rotating a water valve in the faucet.

However, typical water valve for the bathtub requires back and forth rotations of the switch to switching between the two different water outlets, which can be very inconvenient for users.

Therefore, it is desirable to provide a water valve for use with a bathtub to mitigate and/or obviate the aforementioned problems.

SUMMARY OF THE INVENTION

An objective of the present invention is to provide a water valve for use with a bathtub, which provides easier operations.

In order to achieve the above mentioned objective, a housing, a control bolt, an angular positioning device, an upper ceramic plate, a lower ceramic plate and a valve base, the water valve configured to be mounted onto the water supply unit of the bathtub. The housing provides a chamber, the control bolt is placed through the chamber and upwardly extends out of the housing, the chamber is provided with at least two parallel positioning slots facing each other, and a plurality of intake apertures are provided on the housing. The control bolt includes a rotating base at a lower portion, an engaging portion at a bottom face of the rotating base engages with the securing portion on a top face of the upper ceramic plate such that the upper ceramic plate rotates with the control bolt, and a side of the rotating base is provided with an accepting aperture for placing the angular positioning device. The angular positioning device has a pushing rod and an elastic member, an end of the pushing rod is formed as an enlarged end, the elastic member and the pushing rod placed in order in the accepting aperture of the control bolt. The upper ceramic plate has a securing portion on a top surface and a fan-shaped opening on a peripheral side;

the lower ceramic plate has a first through aperture and a second through aperture, the lower ceramic plate secured onto the valve base such that when the valve base is pushed upwardly to cover the bottom face of the housing, the lower ceramic plate is placed in the chamber and makes contact with the upper ceramic plate. The valve base has a first outlet aperture and a second outlet aperture facing each other. The water supply unit has a containment space at an upper portion for accepting the water valve, at least two intake ends and a first outlet end around a sidewall and a second outlet end at a lower portion.

Other objects, advantages, and novel features of the invention will become more apparent from the following detailed description when taken in conjunction with the accompanying drawings.

BRIEF DESCRIPTION OF THE DRAWINGS

FIG. 4 is a cross-sectional view of the water valve according to the embodiment of the present invention.

FIG. 5 is an operation schematic drawing of the embodiment of the present invention.

DETAILED DESCRIPTION OF THE PREFERRED EMBODIMENT

Figure 1:
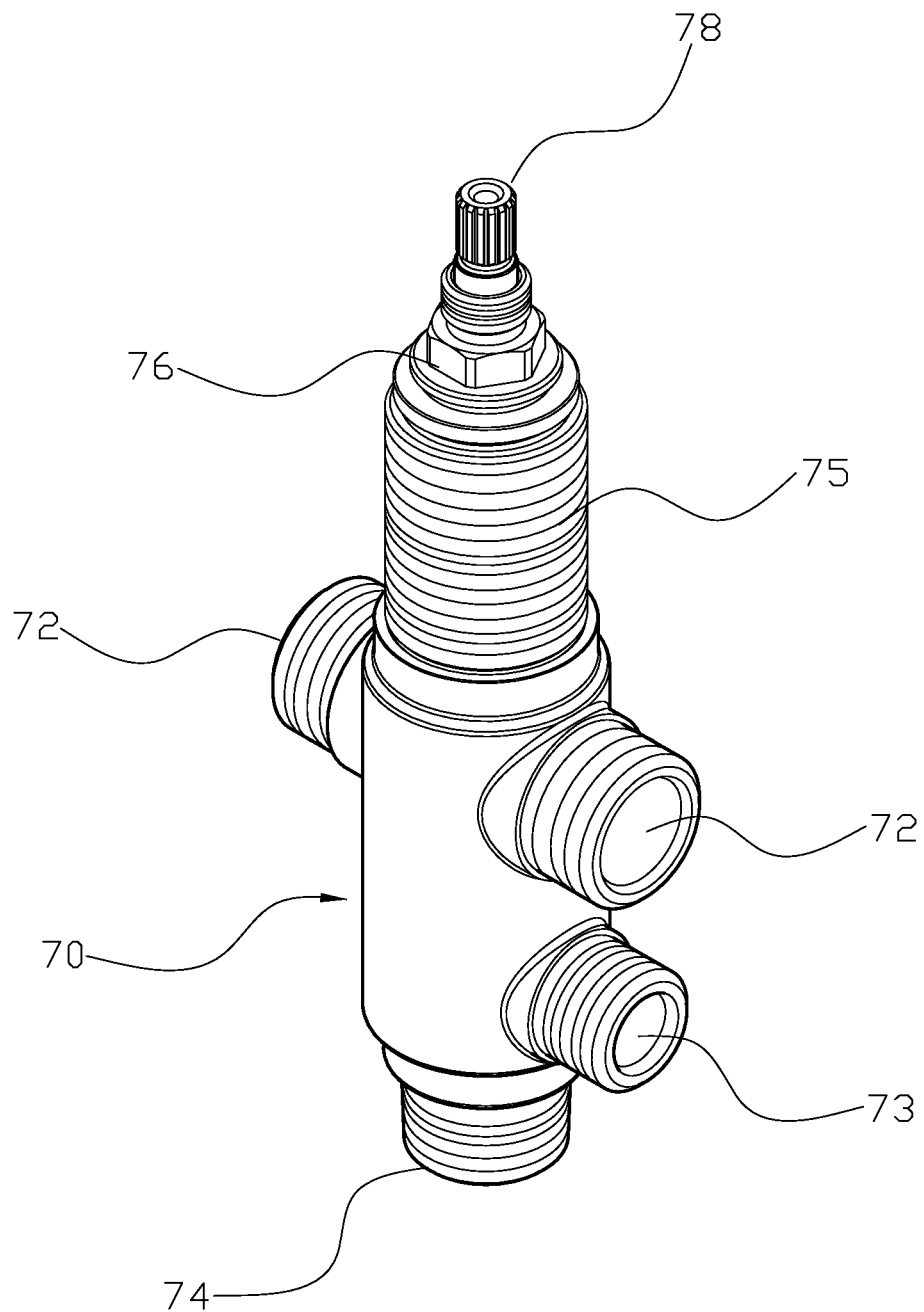
FIG. 1 is a perspective view of an embodiment of the present invention.
Figure 2:
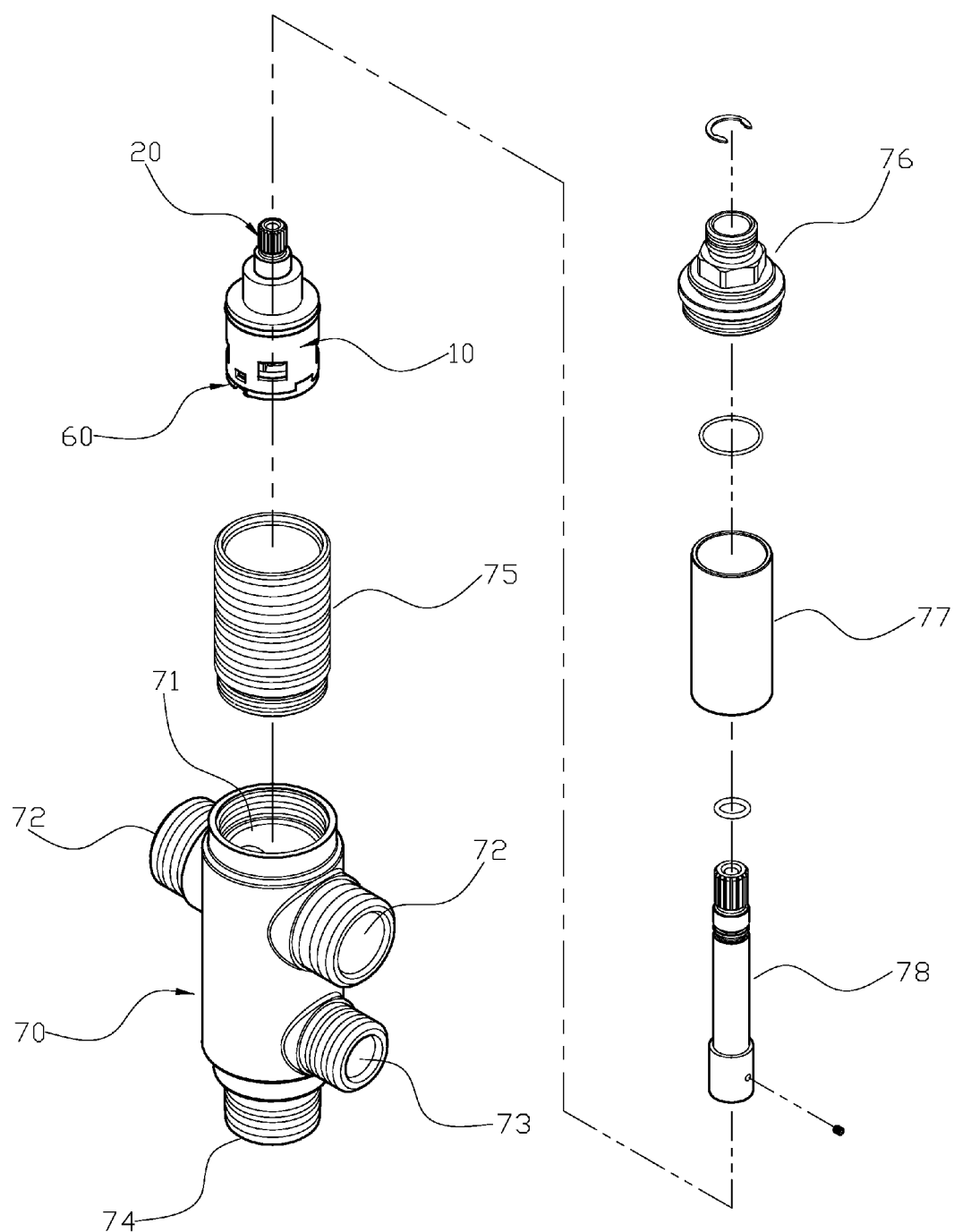
FIG. 2 is an exploded view of the embodiment of the present invention.
Figure 3:
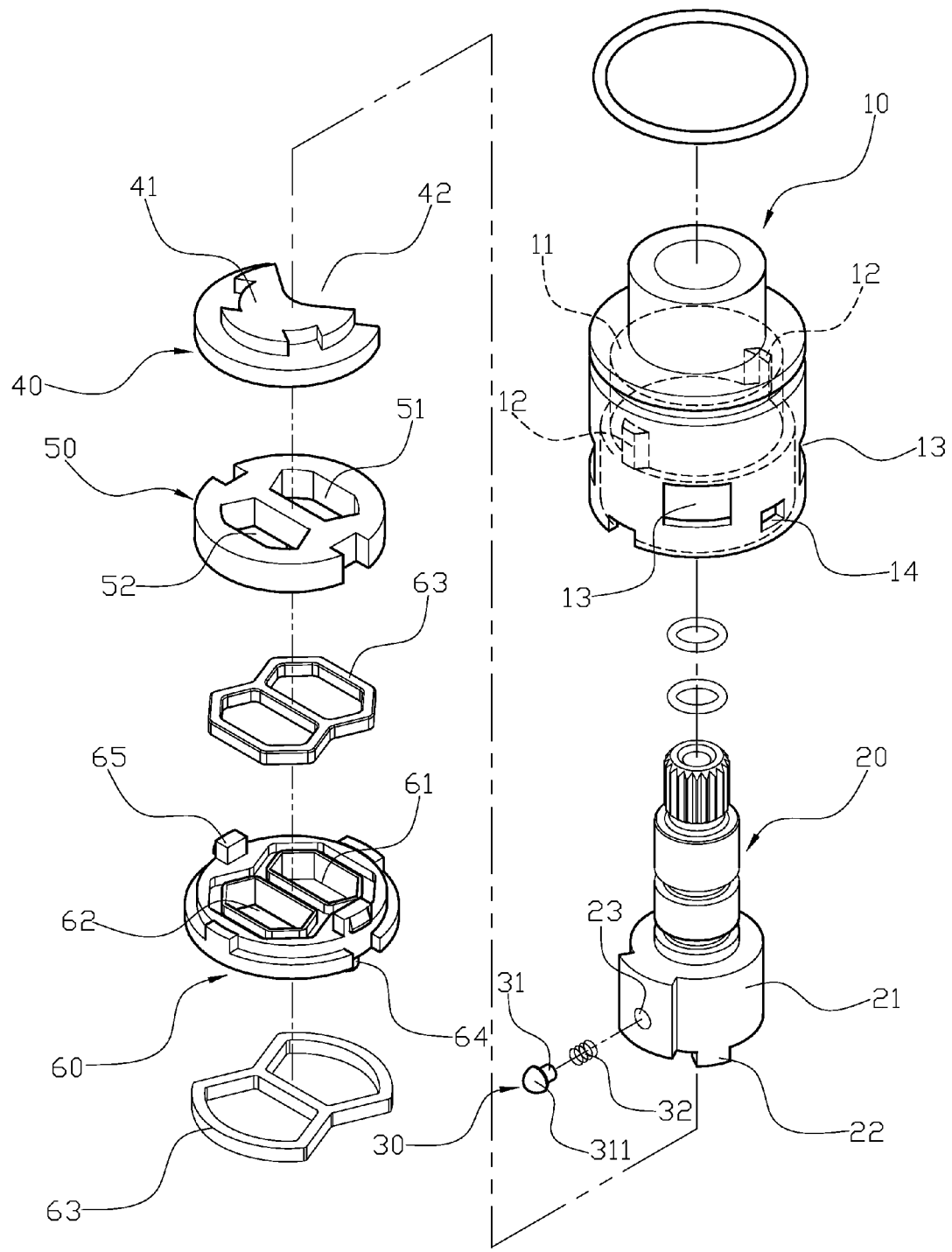
FIG. 3 is a perspective local detail view of a water valve according to the embodiment of the present invention.

Please refer to FIG. 1, FIG. 2, FIG. 3 and FIG. 4. The water valve comprises a housing 10, a control bolt 20, an angular positioning device 30, an upper ceramic plate 40, a lower ceramic plate 50 and a valve base 60, and the water valve mounted onto a water supply unit 70 of a bathtub. The housing 10 provides a chamber 11, and the control bolt 20 is placed through the chamber 11 and upwardly extends out of the housing 10. The chamber 11 is provided with at least two parallel positioning slots 12 with an inclined sidewall facing each other, and a plurality of intake apertures 13 are disposed around the housing 10. The housing 10 further has a pair of fastening apertures 14 at an end. The control bolt 20 includes a rotating base 21 at a lower portion, and an engaging portion 22 at a bottom face of the rotating base 21 engages with the securing portion 41 on a top face of the upper ceramic plate 40 such that the upper ceramic plate 40 rotates with the control bolt 20. A side of the rotating base 40 is provided with an accepting aperture 23 for placing the angular positioning device 30. The angular positioning device 30 has a pushing rod 31 and an elastic member 32. An end of the pushing rod 31 is formed as an enlarged end 311. The elastic member 32 and the pushing rod 31 are placed in order in the accepting aperture 23 of the control bolt 20 such that the elastic member 32 pushes out the enlarged end 311. The upper ceramic plate 40 has a securing portion 41 on a top surface and a fan-shaped opening 42 on a peripheral side. The lower ceramic plate 50 has a first through aperture and a second through aperture, the lower ceramic plate 50 is secured onto the valve base 60 such that when the valve base 60 is pushed upwardly to cover the bottom face of the housing 10, the lower ceramic plate 50 is placed in the chamber 11 and makes contact with the upper ceramic plate 40. The valve base 60 has a first outlet aperture 61 and a second outlet aperture 62 facing each other. An 8-shaped sealing washer 63 is respectively placed around the first and second outlet apertures 61, 62 and on a top and bottom of the valve base 60. The valve base further has at least one positioning pin. Furthermore, the valve base 60 has a positioning pin 64 and protruding claws 65. The protruding claws 65 are used for securing the lower ceramic plate 50 and engaging with the fastening apertures 14 of the housing 10. The water supply unit 70 has a containment space 71 for accepting the water valve, at least two intake ends 72 and a first outlet end 73 around a sidewall and a second outlet end 74 at a lower portion. Moreover, the containment space 71 of the water supply unit 70 has a covering tube 75 and a locking cover 76 passing through the control bolt 20 and engaging with the covering tube 75. An inner tube 77 is provided between the control bolt 20 and the covering tube 75. An extended control rod 78 is attached onto the control bolt 20 to enable the control bolt 20 to be rotated in covering tube 75.

Figure 6:
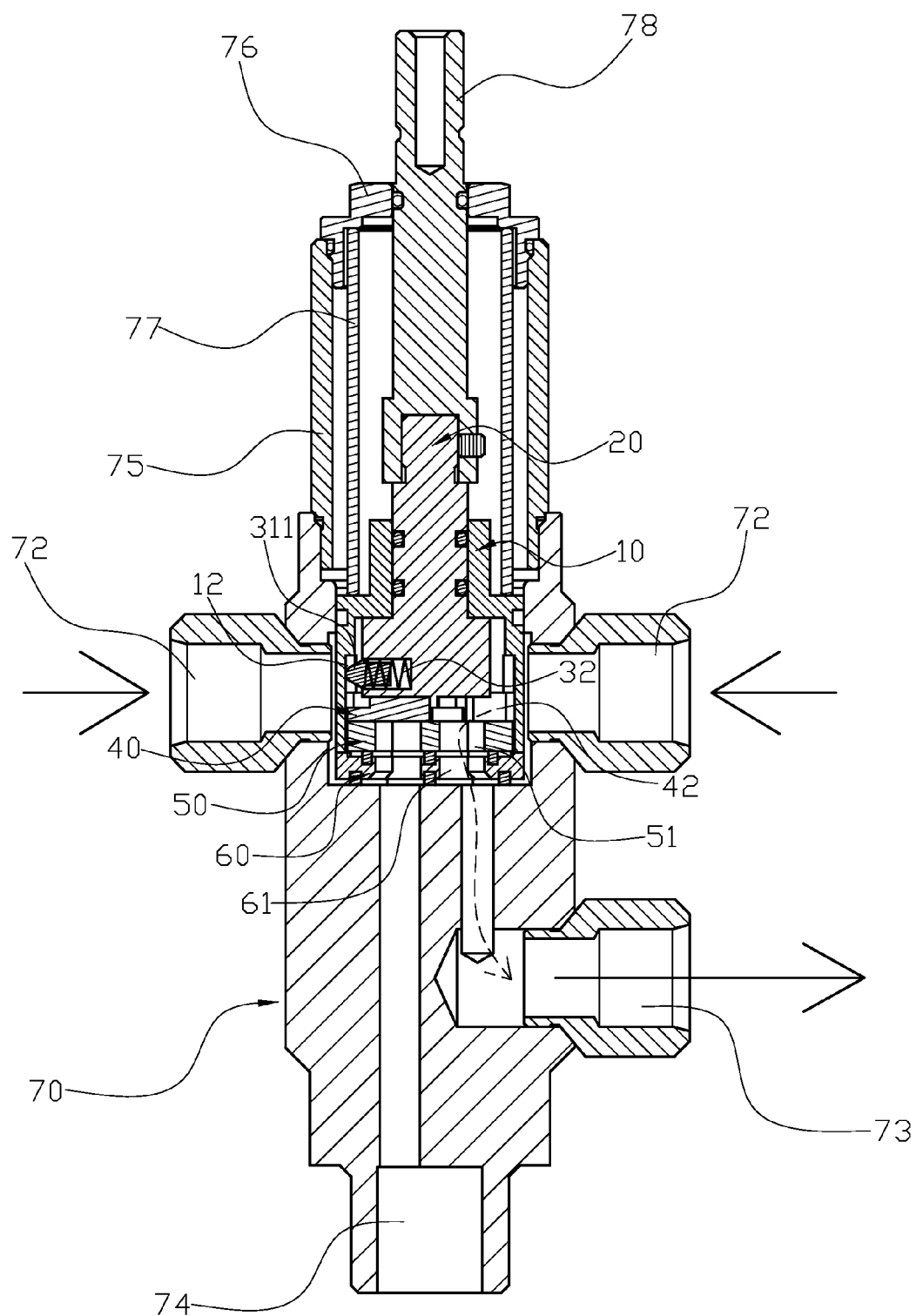
FIG. 6 is an operation schematic drawing of the water valve switching water to a showerhead according to the embodiment of the present invention.
Figure 7:
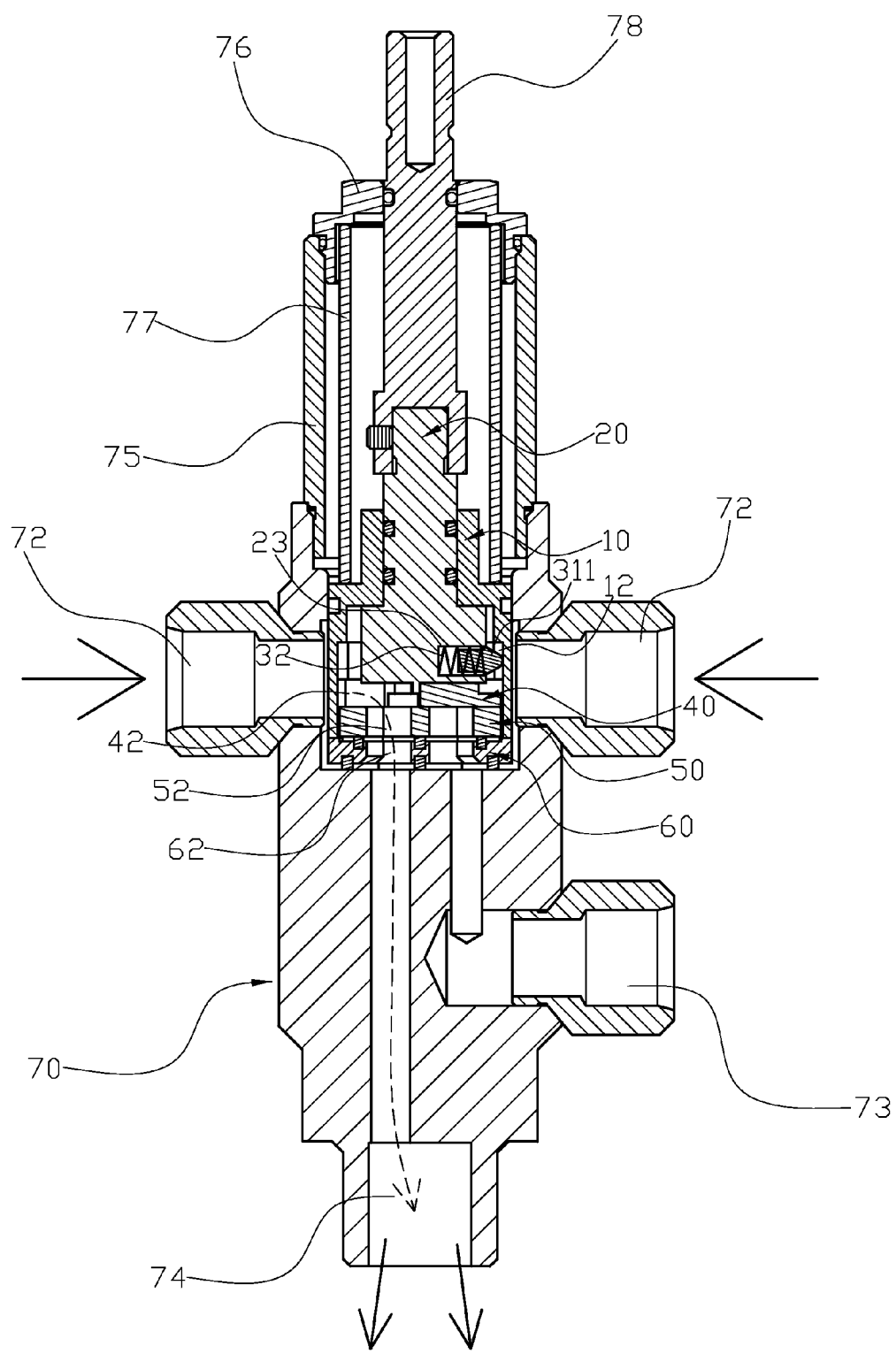
FIG. 7 is an operation schematic drawing of the water valve switching water to bathtub according to the embodiment of the present invention.

For actual structural operation, please refer to FIG. 5 to FIG. 7. The water supply unit 70 with the water valve of the embodiment is mounted onto the shower wall. The two intake ends 72 of the water supply unit 70 are respectively connected to a hot water source and a cold water source, the first outlet end 73 is connected to a showerhead, and the second outlet end 74 is connected to a faucet for a bathtub. In order to make water coming out of the showerhead, with the rotation of the control bolt 20, the upper ceramic plate 40 is driven to align the fan-shaped opening 42 with the first through aperture 51 of the lower ceramic plate 50. Accordingly, the first through aperture 51 is exposed, and water can flow from the two intake ends 72, the intake aperture 13, and the fan-shaped opening 42, the first through aperture 51 and the first outlet aperture 61 and exit form the first outlet end 73. Meanwhile, the pushing rod 31 is pushed out by the elastic member 32, the enlarged end 311 engages with the positioning slot 12 of the housing 10 such that the control bolt 20 can maintain water flow at the showerhead. Alternatively, in order to switch water flow to the faucet for the bathtub, the user keeps rotating the control bolt 20 in the same direction to drive the upper ceramic plate 40 to align the fan-shaped opening 42 with the second through aperture 52 of the lower ceramic plate 50. Consequently, the second through aperture 52 is exposed, and water flows from the two intake ends 72, the intake aperture 13, through the fan-shaped opening 42, the second through aperture 52 and the second outlet aperture 62, and exits form the second outlet end 74. Therefore, either continuous clockwise rotation or counter clockwise rotation can switch water between two different outlets. When the control bolt 20 drives the upper ceramic plate 40 to allow the water flow to the faucet for the bathtub, the enlarged end 311 of the pushing rod 31 is also pushed by the elastic member 32 and engages with another positioning slot 12.

With the above-mentioned embodiment, following benefit can be obtained: the control bolt 20 and the upper ceramic plate 40 can be continuously clockwise or counter clockwise rotated to switch between two different water outlet options, which is more convenient for the user.

Although the present invention has been explained in relation to its preferred embodiment, it is to be understood that many other possible modifications and variations can be made without departing from the spirit and scope of the invention as hereinafter claimed.

What is claimed is:

1. A water valve suitable for use with a bathtub comprising:
a housing, a control bolt, an angular positioning device, an upper ceramic plate, a lower ceramic plate and a valve base, the water valve configured to be mounted onto the water supply unit of the bathtub, wherein,
the housing provides a chamber, the control bolt is placed through the chamber and upwardly extends out of the housing, the chamber is provided with at least two parallel positioning slots facing each other, and a plurality of intake apertures are provided on the housing;
the control bolt includes a rotating base at a lower portion, an engaging portion at a bottom face of the rotating base engages with the securing portion on a top face of the upper ceramic plate such that the upper ceramic plate rotates with the control bolt, and a side of the rotating base is provided with an accepting aperture for placing the angular positioning device;
the angular positioning device has a pushing rod and an elastic member, an end of the pushing rod is formed as an enlarged end, the elastic member and the pushing rod placed in order in the accepting aperture of the control bolt;
the upper ceramic plate has a securing portion on a top surface and a fan-shaped opening on a peripheral side;
the lower ceramic plate has a first through aperture and a second through aperture, the lower ceramic plate secured onto the valve base such that when the valve base is pushed upwardly to cover the bottom face of the housing, the lower ceramic plate is placed in the chamber and makes contact with the upper ceramic plate;
the valve base has a first outlet aperture and a second outlet aperture facing each other; and
the water supply unit has a containment space at an upper portion for accepting the water valve, at least two intake ends and a first outlet end around a sidewall and a second outlet end at a lower portion.

2. The water valve suitable for use with a bathtub as claimed in claim 1, wherein the chamber further has two parallel positioning slots with an inclined sidewall facing each other.

3. The water valve suitable for use with a bathtub as claimed in claim 1, wherein the housing further has a pair of fastening apertures, the valve base has protruding claws which are used for securing the lower ceramic plate and engaging with the fastening apertures of the housing.

4. The water valve suitable for use with a bathtub as claimed in claim 1, wherein an 8-shaped sealing washer is respectively placed around the first and second outlet apertures and on a top and bottom of the valve base.

5. The water valve suitable for use with a bathtub as claimed in claim 1, wherein the valve base further has at least one positioning pin for being engaged with a bottom face of the containment space of the water supply unit.

6. The water valve suitable for use with a bathtub as claimed in claim 1, wherein the containment space of the water supply unit is provided with a covering tube and a locking cover passing through the control bolt and engaging with the covering tube.

7. The water valve suitable for use with a bathtub as claimed in claim 6, wherein an inner tube is provided between the control bolt and the covering tube.

8. The water valve suitable for use with a bathtub as claimed in claim 6, wherein an extended control rod is attached onto the control bolt to enable the control bolt to be rotated in covering tube.

* * * * *